United States Patent [19]

Yamanaka et al.

[11] 3,882,635

[45] May 13, 1975

[54] METHOD OF PRODUCING CELLS OF ALGAE

[75] Inventors: Shigeru Yamanaka; Koji Mitsugi, both of Yokohama, Japan

[73] Assignee: Ajinomoto Co., Inc., Tokyo, Japan

[22] Filed: Mar. 29, 1974

[21] Appl. No.: 455,967

[30] Foreign Application Priority Data

Mar. 30, 1973 Japan.................................. 48-35598

[52] U.S. Cl....................................... 47/1.4; 47/1.4
[51] Int. Cl............................................. A01g 7/00
[58] Field of Search ................ 210/2, 11, 15; 47/1.4

[56] References Cited

UNITED STATES PATENTS

| | | | |
|---|---|---|---|
| 3,320,693 | 5/1967 | Shirota et al. | 47/1.4 |
| 3,403,471 | 10/1968 | Clement et al. | 47/1.4 |
| 3,650,068 | 3/1972 | Meyer et al. | 47/1.4 |

*Primary Examiner*—Robert E. Bagwill
*Attorney, Agent, or Firm*—Hans Berman; Kurt Kelman

[57] ABSTRACT

The newly discovered alga *Prototheca sphaerica* grows readily on waste water discharged from many plants of the food industry, and compares favorably with Chlorella in its nutritive value.

2 Claims, No Drawings

METHOD OF PRODUCING CELLS OF ALGAE

This invention relates to algae, and particularly to a method of producing cells of an alga suitable as a source of protein and other nutrients.

Chlorella has been investigated as a source of protein and vitamin B, and experimental cultures have been operated successfully. However, Chlorella is selective in the carbon sources which can be assimilated and not capable of assimilating many cheap and plentiful materials.

A new alga of the genus Prototheca has now been found by us in the atmosphere and is capable of growing on a wide variety of carbon sources readily available in the waste waters of the food industry and other plants processing natural organic materials. The new alga is less selective among assimilable carbon sources than known strains of Prototheca.

A specimen culture of the new alga *Prototheca sphaerica* FERM P-1943 has been deposited with the Fermentation Research Institute, Agency of Industrial Science and Technology, Ministry for Industrial Trade and Industry, Chiba, Japan, and is freely available from the Institute.

The new strain is characterized by the following properties:

A. Morphological Characteristics
1. Cell:
Cells when cultured on yeast-malt-extract (Y.M.) agar containing:

| | | |
|---|---|---|
| Yeast extract | 0.3 | g/dl |
| Malt extract | 0.3 | g/dl |
| Glucose | 1 | g/dl |
| Peptone | 0.5 | g/dl |
| Agar | 1.5 | g/dl |
| pH 6.8 | | | are spherical and 5 – 7 microns in size.

These cells form rough colonies, but occasionally smooth colonies. Cells which form smooth colonies are slightly larger than those forming rough colonies, and some cells of smooth colonies are elongated or oval.

Cells, except single cells, have a septum and may have a second septum approximately perpendicular to the other septum.

The culture does not form mycelium under aerobic conditions nor does it show clamp connections.

2. Submerged culture:
Cultures shaken 48 hours in Y.M. liquid medium at 30°C showed irregular masses of cells which sedimented rapidly.

3. Agar culture:
Cultures grown on Y.M. agar medium at 30°C for 48 hours are pale yellow, rough, and not glistening. They are almost circular and elevated. Occasionally, smooth type colonies appear.

B. Physiological Characteristics
1. Assimilation of carbohydrates (determined in a medium containing "Yeast Nitrogen Base" DIFCO and 0.5 g/dl of the principal carbon source):
D-Glucose, D-galactose, sucrose, maltose, lactose, cellobiose, trehalose and D-ribose are assimilated. Raffinose is weakly assimilated. Melibiose, L-arabinose, D-mannitol, D-sorbitol, inositol and dulcitol are not attacked.

2. Assimilation of organic acids (as in B 1.):
Acetic acid, gluconic acid and lactic acid are assimilated.

3. Assimilation of alcohols (as in B 1.)
Ethanol is assimilated. n-Propanol and n-butanol are not assimilated.

4. Optimum temperature 30° – 37°C
5. Aerobic
6. $H_2S$: Produced
7. Indole: Not produced
8. Acetylmethylcarbinol: Not produced
9. Catalase: Positive
10. Spore: Not produced
11. Ethyl alcohol: Not produced
12. Mobility: Non-motile The characteristics of the strain were compared with the reports of Krugel [Hedwigia, 33, 241 (1894)] and of Benedict et al. [Mycopathologia et Mycologia Applicata, 7, 251 (1956)] on Prototheca, and the new strain is considered an alga of genus Prototheca. It is not a bacterium because a bacterium having a diameter of 5 – 7 μ has never been known. It is not a yeast because the only yeast strain known to form a crosswall prior to cell-cleavage belongs to genus Schizosaccharomyces and differs substantially from the new strain in its ability of forming alcohol by fermentation. The new strain does not belong to mold fungi nor to basidiomycetes, since there is no mycelium nor clamp connection structure in the cell under aerobic conditions.

When compared with known strains of Prototheca, many characteristics of the new strain were found to be different from those of the known strains. Accordingly, the new strain is considered a new species, *Prototheca sphaerica*.

When compared with *P.ciferrii* IFO 6994, *P.moriformis* IFO 6995, *P.trispora* IFO 6996, *P.wickerhamii* IFO 6997, *P.zopfii* IFO 6998, and *P.stagnora* ATCC 16528, *P.sphaerica* was found to be the only strain whose colonies on Y.M. agar were yellow, all other colonies being white. Among the algae tested, only *P.trispora* produced spores. All tested algae were capable of assimilating D-glucose, acetic acid, and ethanol, none could assimilate melibiose, L-arabinose, D-mannitol, succinic acid, nor citric acid. All gave a negative Voges-Proskauer test, and none produced indole. Properties in which they showed significant differences are listed in Table 1. The cells whose properties are shown in the Table were cultured on Y.M. agar at 30°C for 1 day.

The culture media employed for growing cells of this alga must contain an assimilable carbon source, an assimilable nitrogen source, inorganic salts and minor organic nutrients.

The assimilable carbon sources include carbohydrates such as D-glucose, D-galactose, sucrose, maltose, and lactose, organic acids such as acetic acid and lactic acid, alcohols such as ethanol, and lipids. The assimilable nitrogen sources include ammonium salts such as ammonium sulfate and ammonium succinate, amides such as acetamide, and natural organic substances.

A combination of carbon and nitrogen sources suitable for sustaining the growth of *P.sphaerica* occurs in the waste waters of many industries processing natural organic substances, particularly the food industry. The alga has been grown successfully on waste water from sugar factories, breweries, and other fermentation plants producing amino acids, nucleic acids, and antibiotics, meat processing plants, dairies, fish canneries, bakeries, flour mills, and tanneries.

*P.sphaerica* is cultured aerobically, preferably in the dark, at pH 5 – 9, and at 30° to 37°C, but is capable of growing in broad sunlight at different temperatures and pH values.

of pH 7.2, and the culture was incubated as above.

The weight of dry cells produced and the sugar concentration were determined in aliquots analyzed at the start of incubation and after 3 and 6 days, and the yield of dry cells based on the consumed sugar. The data are listed in Table 2.

TABLE 1

| Cells: | P.sphaerica | P.ciferrii | P.moriformis | P.trispora | P.wickerhamii | P.zopfii | P.stagnora |
|---|---|---|---|---|---|---|---|
| Shape | Spheres | Spheres or ellipsoids | Sheres or ellipsoids | Spheres or ellipsoids | Spheres | Spheres or ellipsoids | Spheres |
| Size, μ | 5 – 7 | (6–9) × (6–30) | (6–9) × (9–15) | (9–24) × (15–45) | 3 – 12 | (6–24) × (6–54) | 2 – 12 |
| Growth at °C | 20 – 45 | 15 – 45 | 20 – 34 | 20 – 37 | 20 – 37 | 20 – 37 | 20 – 30 |
| Assimilation: | | | | | | | |
| D-Galactose | + | + | – | + | + | + | + |
| Sucrose | + | + | – | – | + | + | – |
| Maltose | + | – | – | – | – | – | – |
| Lactose | + | – | – | – | – | – | – |
| Cellobiose | + | – | – | – | – | – | – |
| Trehalose | + | – | – | – | + | – | – |
| D-Ribose | + | – | – | – | – | + | – |
| Lactic acid | + | + | – | + | + | – | – |
| $H_2S$ | + | – | – | – | – | – | – |
| Urease | + | – | – | – | – | – | – |
| Methyl Red test | – | + | – | + | + | + | – |

The cells separate spontaneously from the culture medium by settling when agitation is discontinued and are thus recovered conveniently by decanting. However, centrifuging or filtering may be resorted to for separating them from the liquid broth. The recovered cells are adequately purified by repeatedly suspending them in water.

The invention is further illustrated by the following Examples. The sugar (or saccharide) values reported in the Examples were determined by the method of Fehling-Lehmann-Schoorl. The yields of algal cells were calculated on the basis of cells harvested by centrifuging, washed at least with three changes of distilled water until a suspension of the cells in the washing water showed no trace of the color characteristic of the broth, and dried at 105° – 110°C to constant weight which required 20 to 40 hours.

EXAMPLE 1

*Prototheca sphaerica* FERM P–1943 was cultured on Y.M. agar slant at 30°C for 48 hours, and two loopfuls of the colonies so produced were inoculated into a 100 ml batch of aqueous Y.M. medium containing:

| | | |
|---|---|---|
| yeast extract | 0.3 | g/dl |
| malt extract | 0.3 | g/dl |
| glucose | 1 | g/dl |
| peptone | 0.5 | g/dl |
| pH 6.8 | | | which had been sterilized in a 500 ml shaking flask. The inoculated medium was held at 30°C for 48 hours with shaking (120 r.p.m.).

5 ml Culture broth was inoculated into 100 ml of a 2 percent (by volume) cane molasses solution (pH 7.2) in a 500 ml shaking flast that had been sterilized at 120°C for 15 minutes. The culture was incubated at 30°C for 6 days with shaking.

Another 5 ml of the same culture broth was inoculated into 100 ml of a culture medium containing 6.7 g/l "Yeast Nitrogen Base" DIFCO and 10 g/l glucose

TABLE 2

| Carbon source | Molasses | | | Glucose | | |
|---|---|---|---|---|---|---|
| Days after incubation | 0 | 3 | 6 | 0 | 3 | 6 |
| Dry cells,g/dl | 0.11 | 0.42 | 0.60 | 0.12 | 0.26 | 0.66 |
| Sugar, g/dl | 1.06 | 0.59 | 0.18 | 0.91 | 0.39 | 0.09 |
| Sugar consumed,% | – | 44.3 | 83.1 | – | 57.2 | 90.0 |
| Yield, % | – | 29.3 | 46.2 | – | 13.2 | 59.3 |

EXAMPLE 2

100 ml Culture medium containing 20 g/l lactic acid and 6.7 g/l "Yeast Nitrogen Base" DIFCO of pH 6.0 was placed in a 500 ml shaking flask and sterilized at 120°C for 15 minutes. The medium was inoculated with 5 ml of a seed culture of *P.sphaerica* prepared as in Example 1 and cultured at 30°C for 4 days with shaking (120 r.p.m.).

The algal cells were then collected by centrifuging, washed twice with distilled water, and dried in a vacuum. Dry cell material in an amount of 5.2 g was obtained.

EXAMPLE 3

100 ml Culture medium containing:

| | |
|---|---|
| acetamide | 10 g/l |
| glucose | 10 g/l |
| $MgSO_4.7H_2O$ | 0.3 g/l |
| $K_2HPO_4$ | 0.3 g/l |
| $KH_2PO_4$ | 0.7 g/l |
| $FeSO_4.7H_2O$ | 0.003 g/l |
| $A_5$ – solution | 1 ml/l |
| pH 6.0 | | was placed in a 500 ml shaking flask and sterilized at 120°C for 15 minutes. The medium was inoculated with 5 ml of a seed culture of *P.sphaerica* prepared as in Example 1, and further processed as in Example 2. Dry cell material in an amount of 3.1 g was obtained.

The $A_5$-solution contained, per liter, 2.86 g $H_3BO_3$, 2.50 g $MnSO_4.7H_2O$, 0.222 g $ZnSO_4.7H_2O$, 0.079 g $CuSO_4.5H_2O$, and 0.021 g $Na_2MoO_4$.

EXAMPLE 4

10 ml Ethanol was mixed with a sterilized solution of 6.7 g "Yeast Nitrogen Base" DIFCO in 1 liter water, pH 7.0. The medium so obtained was inoculated with 5 ml of a seed culture of P.sphaerica prepared as in Example 1 and cultured at 30°C for 48 hours with shaking (120 r.p.m.). 6.8 g Dry alga cells were harvested.

EXAMPLE 5

100 ml Waste liquid in which mackerel had been boiled (B.O.D. 24,000 p.p.m.) was placed in a 500 ml shaking flask, inoculated with 5 ml of a seed culture of P.sphaerica prepared as in Example 1, and cultured at 30°C for 24 hours with shaking.

The broth was then centrifuged, and 1.03 g/dl dry alga cells were harvested. The B.O.D. of the supernatant was found to be 4,600 p.p.m.

EXAMPLE 6

100 ml Of a fermentation broth (B.O.D. 11,200 p.p.m.) from which histidine crystals had been recovered by centrifuging was placed in a 500 ml shaking flask, and sterilized at 120°C for 15 minutes. The medium was inoculated with 5 ml of a seed culture of P.sphaerica prepared as in Example 1 and cultured at 30°C for 48 hours with shaking (120 r.p.m.).

The broth was then centrifuged, and 0.34 g/dl dry algal cells were harvested. The B.O.D. of the supernatant was 2,000 p.p.m.

EXAMPLE 7

5 Liters waste liquid from the dextrose process of a starch refining plant which consisted of flume water and breached waste water (B.O.D. 5,200 p.p.m.) were placed in a 10 liter shaking flask, inoculated with 100 ml of a seed culture of P.sphaerica prepared as in Example 1, and cultured at 30°C for 24 hours with shaking (120 r.p.m.).

When the broth was centrifuged, 0.20 g/dl dry algal cells were harvested. The B.O.D. of the supernatant was 80 p.p.m.

What is claimed is:

1. A method of producing algal cells which comprises culturing Prototheca sphaerica FERM P-1943 in an aqueous culture medium containing assimilable sources of carbon and nitrogen, inorganic salts, and minor organic nutrients until the cells of said Prototheca sphaerica multiply in said culture medium, and recovering the multiplied cells from said medium.

2. A method as set forth in claim 1, wherein said Prototheca sphaerica is cultured aerobically in said medium in the dark at pH 5 – 9, and at 30° to 37°C.

* * * * *